Patented May 26, 1942

2,284,570

UNITED STATES PATENT OFFICE

2,284,570

COATING AND IMPREGNATING COMPOSITION

Anthony H. Gleason, Westfield, N. J., assignor to Standard Oil Development Company, a corporation of Delaware No Drawing. Application February 21, 1939, Serial No. 257,669

5 Claims. (Cl. 260—18)

This invention relates to polyester compounds and methods of producing and using same, and is a continuation in part of patent applications Ser. No. 749,928, filed October 25, 1934, issued as Patent No. 2,147,647 on February 21, 1939 and Ser. No. 244,561, filed December 8, 1938.

Certain hydroxy acids possess the property of esterifying per se under the influence of heat and other agents to produce long chain products hereafter termed "polyesters." Such esterification reactions are, in general, promoted by heat and by catalysts such as strong acids, e. g. sulfuric acid. In most instances, however, strong acids of this type are objectionable due to the side reactions which are induced, giving rise to low molecular weight polymers of very dark color. In the case of 12-hydroxy stearic acid, for example, a secondary alcohol group is present which readily splits off forming water and an olefinic acid, especially if strong acid catalysts are employed, and these results generally prevent formation of polyesters having a molecular weight above 5,000 or 6,000.

Another objectionable feature in the esterification processes heretofore employed is the carrying out of the reaction in the presence of air. This also gives rise to oxidation side reactions which appear to produce considerable quantities of dark colored products.

Objects of this invention are to produce high molecular weight polyesters within a reasonable period of reaction time and to produce a light colored product suitable for many uses for which previous polyesters of this type were unsuited and to produce polyesters having a molecular weight substantially above 5,000 or 6,000, and preferably of at least 10,000.

Further objects will be apparent from the subsequent discussion.

According to this invention, organic hydroxy acids, preferably those having more than 5 or 6 carbon atoms between the hydroxyl and carboxyl groups, are subjected to auto-esterification or condensation by the use of very effective catalysts and preferably carrying out the reaction in an inert or better still a reducing atmosphere. Depending upon the raw materials used, several types of polyesters may be obtained as indicated, for example, by the following formulas:

"A"  $HO[-(CH_2)_x COO-]_n H$

"B"  $HO\left[-\underset{R}{CH}-(CH_2)_x COO-\right]_n H$

"C"  $HO\left[-(CH_2)_y-\underset{R}{CH}-(CH_2)_x COO-\right]_n H$

Polyesters of type A result from the auto-esterification of simple hydroxy acids containing a primary hydroxy group. Type B results when the hydroxyl group is present in a secondary position due to the presence of an organic side chain R being attached to the same carbon to which the hydroxyl group is attached. Type C is like A in having a primary hydroxyl group, but differs therefrom in having an organic side chain R. Types B and C are similar in that they each have a side chain but these side chains are in different positions. Where $x$ is 5 or less in formula A and less than 5 in formula B the tendency is toward the formation of lactones or lactides without much formation of high molecular weight esters. R may be any organic group, preferably hydrocarbon e. g. methyl, butyl, phenyl, etc. $n$ represents the degree of condensation or the number of units in the chain and can be determined up to a certain point by dividing the neutralization value of the original hydroxy acid by the neutralization value of the product.

A specific example of a suitable raw material for use according to this invention is 12-hydroxy stearic acid which has a molecular weight of 300 and a neutralization value of 187 and results in the formation of a polyester of type B in which $x$ is 10 and R is $C_6H_{13}$.

One of the main uses for this product is as a thickening agent for mineral, vegetable and other oils. Polyesters not only increase the viscosity of such oils when added in small proportions, but they also increase their viscosity index, i. e., their viscosity-temperature relationship, which characteristic is described in an article by E. W. Dean and G. H. B. Davis, "Viscosity Variations of Oils with Temperature," from Chem. and Met., volume 36, pages 618–619 (October, 1929). For this reason it is necessary to prepare soluble polyesters for such uses. For this purpose polyesters of types such as B and C, having a side chain attached to one or more carbon atoms between the hydroxyl and carboxyl groups, are prepared, for instance, by the use of hydroxy acids having a secondary alcohol group. This is desirable because polyesters of type A produced from the so-called omega hydroxy acids while easier to prepare because of the stability of the primary alcohol group are inferior with regard to solubility in oils. Other groups such as halogens, alkoxy, phenyl, etc. may be present in the hydroxy acid molecule to be condensed. Other compounds may be used as raw materials. For example, oleic acid sulfated with sulfuric acid and hydrolyzed to produce a hydroxy stearic acid may be used. Oxidized glycols, oxidized hydrocarbons, amino acids, and the like, may be also employed in many cases.

The invention, therefore, may be said to apply broadly to the auto-condensation of monocarboxylic acids containing a basic group and containing a hydrocarbon chain of preferably more than 5 carbon atoms between the basic group and the acid group, said hydrocarbon chain containing or not containing substituted groups in place of one or more of the hydrogens. Such acids may be represented by the following formula:

"D"     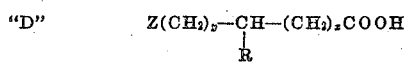

in which R may be either hydrogen or any organic group, preferably a hydrocarbon radical, either $x$ or $y$ may be 0 or any number provided $x+y=$ at least 5, and in which Z is a functional group capable of undergoing condensation with carboxyl groups, such as those groups having one replaceable hydrogen, as for example the hydroxy group, and in many cases, the amino and similar groups.

As catalysts, acids preferably organic ones having a dissociation constant greater than $.03 \times 10^{-3}$, such as chloracetic, dichloracetic, fumaric, phthalic and adipic acids, have been found to give better results than the strong mineral acids ordinarily employed for esterifications. The dicarboxylic acids especially, such as adipic, phthalic and fumaric acids, have been found to give exceptionally good results. It is preferable but not essential to maintain a 1:1 ratio of hydroxyl to carboxyl groups in the reaction mixture as by adding a glycol, such as octadecane 1:12 diol, glycols from cracked wax, etc., in an amount equivalent to the amount of catalytic acid used which is very small, generally in the neighborhood of 1%, although amounts as low as 0.01 or 0.1% or as high as 5% or more have been used successfully.

From a theoretical standpoint, any dry oxygen-free gas may serve as an inert atmosphere for the reaction but actually hydrogen has proved to give the best results, especially with regard to color of the final product. It has been found that moisture inhibits the condensation to a certain extent so that it is preferable to use a dehydrated medium for this purpose. It is also desirable to pass a dry inert gas, e. g. nitrogen, hydrogen, carbon dioxide and the like, through the reaction mixture to remove water formed by the condensation.

The temperature of esterification is generally between 180° C. to 220° C., although temperatures a slow as 100° C. to 150° C. or as high as 250° C. may sometimes be employed. When the hydroxyl group present is in a secondary position, the temperature should not exceed 200° C., and for primary, 250° C. The time of heating may be from 30 to 100 hours although times of reaction of 10 hours or lower or even as high as 150 hours may be employed in many cases. A suitable solvent, preferably boiling above 200° C., may be used if desired, for example: kerosene, xylene, $SO_2$-extracts of hydrocarbon oils, di-chlorobenzene, etc. Subatmospheric or superatmospheric pressure may be employed to assist the esterification, and solid contact masses as such or coated with catalyst may be used advantageously. The product may be extracted by solvents such as higher ketones or alcohols, light hydrocarbons, chlorine compounds, ethers, sulfur dioxide, etc., and may be precipitated out from solution fractionally or all at once by methyl alcohol or other similar precipitant. The product may be milled or forced through an orifice or worked in gears or cracked to reduce the average molecular weight and give more stable viscosity in the blend.

The following experiment illustrates the results obtained heretofore.

Pure 12-hydroxy stearic acid is prepared by the hydrogenation and saponification of castor oil (subsequently freed from stearic acid by extraction with benzine), and heated in an inert atmosphere or in vacuo for several days at 200 to 220° C. with stirring. A dark viscous oil is obtained having the following properties:

| | |
|---|---|
| Viscosity Saybolt at 100° F | 50,690 |
| Viscosity Saybolt at 200° F | 3,350 |
| Viscosity Index | 123 |
| Neutralization value | 15 mg. KOH/gm. |
| Molecular weight (approx.) | 3,500 |
| Iodine number | 6.8 cg. I/gm. |

Carbon dioxide was passed through the heated oil in order to facilitate removal of the water formed by condensation. In the above case, the time of heating was 144 hours and it was found that a longer time produced only a slight decrease in the neutralization value of the oil. The oil was decidedly off color and the iodine value gave evidence of either cracking or dehydration of the hydroxy acid to form olefinic acids. It will also be noted that the reaction period is exceptionally long and that higher molecular weights cannot be reached by this method.

*Example 1*

In contrast to the above test, an experiment was carried out according to this invention, in which 200 gm. of pure 12-hydroxy stearic acid was mixed with 2.5 gm. of adipic acid. The mixture was placed in a flat-bottomed, wide-mouthed flask, fitted with a side arm at the neck and an inlet tube reaching to the bottom of the flask. The mixture was melted at 100 to 120° C. and a stirrer with a mercury seal for cutting off the air was attached. Dry hydrogen was bubbled through the melt at a rate of 5–6 liters per hour until the flask was thoroughly flushed out.

As soon as the air had been replaced, the mixture was heated to 185–190° C. with stirring and kept at that temperature for 72 hours. At the end of that time the mixture had become so viscous as to wind up on the stirrer. On cooling, the light colored product became tough and rubbery and was practically transparent in ⅛ inch layers. Its estimated molecular weight was about 14,000. Blends of this product were prepared with a Coastal oil and linseed oil, the results being as follows:

| | Coastal oil | +2% polyester |
|---|---|---|
| Viscosity at 100° F. (Saybolt) | 360 | 606 |
| Viscosity at 210° F. (Saybolt) | 50 | 70 |
| Viscosity Index (V. I.) | 38 | 98 |

| | Linseed oil | +2% polyester |
|---|---|---|
| Viscosity at 100° F | 139 | 238 |

It will be noted that the product not only raises the viscosity of oils in small concentrations but also improves greatly the viscosity index.

*Example 2*

An experiment was carried out similar to that shown in Example 1 but differing therefrom in the addition of 5 grams of octadecane 1:12 diol. A light colored product similar but somewhat superior to that obtained in Example 1 was produced.

In preparing these polyesters, it may be desirable to homogenize the product so as to obtain a polyester having a fairly uniform molecular weight, i. e. a relatively narrow range of molecular weights. For instance, a polyester having an average molecular weight of about 14,000 may contain a substantial amount of material having a molecular weight ranging from 14,000 down to 10,000 or even 5,000 or even lower, and it may also contain a substantial amount of material having a molecular weight ranging upward from 14,000 to 20,000 or 30,000 or even higher, although generally the major proportion of the polyester has a molecular weight within about 5,000 or so above or below the average and the mixed product only contains a relatively few percent of constituents having very low and very high extremes of molecular weight. To effect a homogenization or a more uniform molecular weight, the whole polyester product is subjected to heating or mechanical working such as by kneading or milling or forcing the polyester alone or in solution in a suitable liquid vehicle through a fine orifice or a colloid mill or by a combination of heating and mechanical working, or still further by selective precipitation from solution such as by cooling and/or adding a nonsolvent such as acetone, alcohol, hexane, etc. The mechanical working and heating to very high temperature both tend to depolymerize some of the constituents having an extremely high molecular weight as they will generally break down before the lower molecular weight constituents; on the other hand, the selective precipitation enables a recovery of the higher molecular weight constituents substantially free from the lower molecular weight ones. By a combination of these various methods, one may obtain practically any desired fraction of either high, low or medium molecular weight.

Novel products prepared according to this invention are light colored, or colorless, plastic and elastic solids, and range in molecular weight from 5,000 or 10,000 to 40,000 or even more, and have an iodine number less than 5 cg. I/gm. and a neutralization value less than 10 mg. KOH/gm. They are exceptionally well suited as a lubricant or as a coating or impregnating material alone or in solution together with solvents and other compounding agents. They are also satisfactory as blending agents in fuels, lubricants including greases, paints, insulating oils, pulp oils, glycerides or other esters, textile oils, emulsions, soluble oils, as a compounding agent in plastics, resins, rubber, waxes, etc., and in conjunction with dyes, sludge dispersers, other thickeners, pour inhibitors, oxidation inhibitors, soaps, oiliness agents, extreme pressure lubricating agents, metallo-organic compounds, colloidal metals, graphite, and the like.

These polyesters possess oxidation inhibiting properties, especially in low concentrations as, for example, 0.01 to 0.1%. They also act as sludge dispersers in lubricating oils in concentrations of 0.1 to 1.0% or higher. They may be used as blending agents in concentrations of 0.01 to 1% to 5% to 30% or 50% or more, if desired.

The polyesters of this invention are particularly useful in preparing coating or impregnating compositions because these polyesters have the property of increasing the viscosity of the liquid vehicle in which they are dissolved and due to their oxygen content they are compatible with many types of liquid drying vehicles with which other types of thickeners such as high molecular weight polyisobutylene are not compatible. These polyesters are therefore especially suited for use in preparing paints, lacquers and varnishes or any other type of coating or impregnating compositions for treating various types of bases such as wood, metal, glass, paper, cloth, asbestos, cellulose derivatives, e. g. regenerated cellulose, nitro-cellulose, ethyl or benzyl cellulose, cellulose acetate, etc., any of these materials being either in large bulk form or shaped articles or in the form of sheets, films, or fibers, or in compounded products such as laminated sheet material. The polyesters of this invention have good adhesive qualities and may be used satisfactorily as a binder in preparing laminated sheet materials, e. g. paper-paper, paper-cloth, paper-metal foil, etc.

In all these uses the polyesters have a particular advantage that they are substantially saturated in respect to hydrogen and do not oxidize or harden when exposed to air and weather, etc. They have good waterproofing characteristics and they are especially useful in preventing deterioration of metal, paper, etc. as by oxidation, hydration, etc.

In preparing liquid coating and/or impregnating compositions according to this invention, generally the liquid drying vehicle amounts to about 50-95% by weight of the total composition and the polyester is about 0.1-30% or usually about 1-20%, and for most purposes 5-10% is used. The exact amount of the polyester to be used will depend upon the molecular weight of the polyester. For instance, 5% of a polyester having an average molecular weight of 20,000 will have substantially the same thickening effect as 10% of a polyester having an average molecular weight of about 10,000. The amount of polyester thickener will also depend upon other factors such as the viscosity of the liquid vehicle used and the viscosity or spreading characteristics desired in the finished composition.

In these liquid coating and impregnating compositions the polyester accomplishes several useful results. One is the thickening of an oil such as linseed oil or the like for which satisfactory thickeners have not been previously available and another effect is a retarding of the settling of pigments which may be added. There is another result which is directly or indirectly dependent upon both of the effects, i. e. that the use of these polyesters makes it possible to use much lower viscosity and frequently cheaper liquid vehicles for the body of the composition.

The liquid drying vehicle may be a fatty drying oil selected from the group consisting of animal, vegetable or fish oils, or synthetic drying oils made by oxidation or air blowing of unsaturated aliphatic hydrocarbon liquids, e. g., a naphtha fraction obtained by vapor phase cracking of higher boiling petroleum fractions. Suitable fatty drying oils are linseed oil, hempseed oil, tung oil, menhaden, etc., or similar oils which have been boiled or air blown. All of these various drying oils dry by oxidation which may, of course, be accelerated by heat or circulation of air or oxygen over the surface of the base coated with a film of the polyester coating composition.

In contradistinction to the above drying oils, one may use volatile solvents which are liquid vehicles which dry by evaporation. These include aromatic hydrocarbons such as benzene, toluene, and the like, or naphthenic hydrocarbons, phenolic or other extracts of petroleum distillates, oxygen or chlorine-containing compounds such as ketones, esters, carbon tetrachloride, ethylene dichloride, etc., turpentine or even naphtha to some extent, especially if mixed with other solvents such as some of those mentioned above.

In addition to the above mentioned constituents of the coating or impregnating compositions, other addition agents may be used such as various resins, e. g., ester gums, amber, copal, shellac, colophony, etc. (generally used in amount of about 1–20%), or various gums and plasticizers, e. g., ethyl abietate, etc. (useful in amounts of 0.5–10% or so), as well as certain other materials which may be classified as nonvolatile mutual solvents such as dibutyl phthalate and the like which are especialy useful in preparing cellulose lacquer compositions with which the polyesters, especially those of high molecular weight, are not as compatible as with other types of coating composition constituents. Such mutual solvents are generally used in amounts ranging from about 1 to 20%, depending upon the amounts and relative proportions of the materials which are desired to be made compatible. In the case of paints or other coating compositions in which insoluble pigments are present, especially if the pigments are relatively heavy and tend to settle out and cake on the bottom of the container upon standing, it is desirable to use some pigment dispersing promoters such as about 1–20% of more or less inert fillers such as aluminum hydrate, terra alba or other clays, silica, talc, whiting, asbestine, etc., or smaller amounts, such as about 0.1–5.0%, of special materials such as stearic acid, sodium soaps of petroleum sulfonates and the like which probably owe their beneficial effect to a combination of wetting and dispersing actions.

It is, of course, also desirable to use driers such as cobalt, manganese, lead, or other similar metal naphthenate, oleate, or linoleate, etc. soaps, to accelerate the oxidation of the drying oils such as linseed oil, etc.

The polyesters of this invention are particularly suitable for making electrical insulation such as motor and generator windings comprising paper, textile or asbestos fabric impregnated either with polyester alone or with a solution of linseed oil thickened with polyester or, if desired, an insulating layer may be made of mica flakes and asbestos fibers having a binding medium of polyester alone or dissolved in linseed oil. If desired, resins or other hardening agents may be added.

An example of a suitable liquid composition useful per se as a coating or impregnating composition and likewise useful as a liquid body for preparing paints, etc. by addition of other ingredients is as follows:

| | Per cent |
|---|---|
| Linseed oil | 95–98 |
| Polyester (mol. wt. of about 15,000) | 5–2 |

An illustration of a non-drying liquid vehicle having about the same viscosity as raw linseed oil at 100° F. is the following composition:

| | Per cent |
|---|---|
| Varsol* | 91 |
| Polyester (11 T. N.**) | 9 |

*A refined petroleum hydrocarbon distillate having a boiling range of 300–400° F. (or about 150–200° C.).
**T. N.=tetralin number, i. e. $\frac{1}{10}$ of the number of seconds required for a solution (2.3% of polyester in tetralin) to flow through an Ostwald viscosimeter, at 20° C. (11 T. N. probably is equivalent to about 14,000 mol. wt.)

The following example shows how the polyester may be used with a low viscosity solvent to serve as a diluent for drying oil such as linseed oil:

| | Per cent |
|---|---|
| Linseed oil | 50 |
| Varsol | 45 |
| Polyester (11 T. N.) | 5 |

An example of a suitable paint composition is as follows:

| | Per cent |
|---|---|
| Linseed oil | 50.0 |
| Titanox (white pigment) | 20.0 |
| Drier | 0.5 |
| Polyester | 5.0 |
| Varsol (balance) | 24.5 |

It is obvious, of course, that the proportions of the various ingredients to be used will depend upon the conditions under which the composition is to be used and will depend upon the types of raw materials available.

It is not intended that the invention be limited to the certain specific embodiments shown but in the appended claims it is intended to claim all inherent novelty in the invention as broadly as the prior art permits.

I claim:

1. A coating composition comprising a liquid drying oil vehicle blended with a long chain polyester which is an autocondensation product of a saturated monocarboxylic fatty acid containing a hydroxyl group attached to a secondary carbon atom, said polyester having a molecular weight of at least 5,000, being light in color, soluble in mineral hydrocarbon oil, and having the general formula:

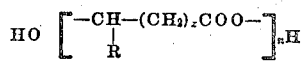

in which $x$ is at least 5, R is a hydrocarbon group containing 6 carbon atoms, and the bracket having a subscript $n$ encloses the recurring structural unit of the polyester.

2. A coating and impregnating composition comprising a liquid drying oil vehicle blended with a polyester which is an autocondensation product of 12-hydroxy stearic acid, said polyester having a molecular weight above 5,000, being light in color, being compatible with both fatty drying oils and mineral hydrocarbon oils, and containing in a long chain the recurring structural unit:

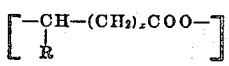

wherein $x$ is 10 and R is the hydrocarbon radical $C_6H_{13}$.

3. A paint comprising a pigment suspended in a liquid drying oil vehicle blended with a mineral hydrocarbon oil thinner and an oil-soluble linear polyester which is an autocondensation product of a saturated monocarboxylic fatty acid containing a chain of at least 5 ($CH_2$) groups and having a hydroxyl radical attached to a secondary carbon atom in the chain, said polyester having a molecular weight above 5,000, being light in color, compatible with mineral hydrocarbon oils, and having a recurring ester group containing the hydrocarbon group:

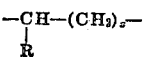

wherein $x$ is at least 5 and R is a hydrocarbon radical containing 6 carbon atoms.

4. A paint comprising a pigment suspended in a liquid drying oil vehicle blended with a volatile mineral hydrocarbon oil thinner and an oil-soluble polyester which is an autocondensation product of a saturated mono-carboxylic fatty acid containing a hydroxyl group attached to a secondary carbon atom, said polyester having a molecular weight above 5,000, being light in color, compatible with mineral hydrocarbon oils, and containing in a long chain the recurring structural unit:

$$\left[ \begin{array}{c} -\mathrm{CH}-(\mathrm{CH_2})_x\mathrm{COO}- \\ | \\ \mathrm{R} \end{array} \right]$$

wherein $x$ is at least 5, and R is a hydrocarbon radical containing 6 carbon atoms.

5. A base coated and protected by a plastic composition comprising a plastic polyester which is an autocondensation product of a saturated mono-carboxylic fatty acid containing a hydroxyl radical attached to a secondary carbon atom with a chain of at least 5 ($CH_2$) groups between said secondary carbon atom and the carboxyl group, said polyester having an average molecular weight above about 5,000, being soluble in mineral and in fatty oils, being light colored, having a non-hardening plasticity, having resistance to oxidation, resistance to water, and forming a rust-preventing and waterproofing adherent coating on the base, said polyester being characterized by containing a recurring ester group containing the hydrocarbon group:

$$-\underset{\underset{\mathrm{R}}{|}}{\mathrm{C}\mathrm{H}}-(\mathrm{CH_2})_x-$$

wherein $x$ is at least 5, and R is a hydrocarbon radical containing 6 carbon atoms.

ANTHONY H. GLEASON.